(12) United States Patent
Carron

(10) Patent No.: US 8,937,600 B1
(45) Date of Patent: Jan. 20, 2015

(54) METHOD AND APPARATUS FOR INTERPRETING MULTI-TOUCH EVENTS

(75) Inventor: David McLean Carron, Saint Martin d'Uriage (FR)

(73) Assignee: Infragistics, Inc., Cranbury, NJ (US)

( * ) Notice: Subject to any disclaimer, the term of this patent is extended or adjusted under 35 U.S.C. 154(b) by 309 days.

(21) Appl. No.: 13/225,115

(22) Filed: Sep. 2, 2011

(51) Int. Cl.
*G06F 3/041* (2006.01)

(52) U.S. Cl.
USPC .......................................... 345/173

(58) Field of Classification Search
CPC ....... G06F 3/041; G06F 3/044; G06F 3/0488; G06F 3/04883; G06F 2203/04808
USPC .................................. 345/173–182
See application file for complete search history.

(56) References Cited

U.S. PATENT DOCUMENTS

| | | | |
|---|---|---|---|
| 6,597,347 B1 | 7/2003 | Yasutake | |
| 7,256,772 B2 | 8/2007 | Morrison | |
| 7,870,496 B1 | 1/2011 | Sherwani | |
| 2009/0073131 A1 | 3/2009 | Yeh | |
| 2010/0020026 A1 | 1/2010 | Benko et al. | |
| 2010/0088532 A1 | 4/2010 | Pollock et al. | |
| 2010/0171712 A1* | 7/2010 | Cieplinski et al. | 345/173 |
| 2010/0214235 A1 | 8/2010 | Shmaya et al. | |
| 2011/0157083 A1* | 6/2011 | Hershman et al. | 345/174 |

* cited by examiner

*Primary Examiner* — Kevin M Nguyen
*Assistant Examiner* — Kenneth B Lee, Jr.
(74) *Attorney, Agent, or Firm* — Moser Taboada

(57) ABSTRACT

A method and apparatus for interpreting multi-touch events on a computing device comprising creating a reference coordinate system using first two touch points A and B on the device, creating a modified coordinate system using second two touch points C and D on the device, determining a reference origin point (O) for the reference coordinate system where a first angle is formed by the points AOB as a right angle and determining a modified origin point (O') for the modified coordinate system where a second angle is formed by points CO'D as a right angle; and calculating a transformation matrix T between the reference coordinate system and the modified coordinate system.

12 Claims, 5 Drawing Sheets

METHOD AND APPARATUS FOR INTERPRETING MULTI-TOUCH EVENTS

BACKGROUND

1. Field

Embodiments of the present invention generally relate to applications for analyzing user input, and more particularly, to a method and apparatus for interpreting multi-touch events using basis vectors for defining a coordinate system.

2. Description of the Related Art

Many current generation computing devices provide for their screens to be operated by multiple touch events simultaneously, generally known as multi-touch events or as gestures. Multi-touch allows users to make a gesture that, for example, rotates an image using two fingers, moves an image, or manipulates a software application, game or utility in such a way as to mimic the User's input motion. Currently, mobile operating systems such as Android or iOS and mobile applications use gesture-based recognition of multi-touch transformations. For example, if a user would like to rotate an image, a rotation gesture is recognized as the touch points moving in a circular direction. Similarly, if a user would like to translate an image, a translation or swipe gesture is recognized as the touch points moving in a lateral direction.

Also, if a user would like to scale an image or object, or perform a zooming function, a pinching or similar gesture, it is recognized as the touch points moving towards the same point, or moving outwards from a point. However, performing these actions on an object requires tracking a user's gesture and comparing it to known gestures, making it error prone and restrictive since User's often perform gestures in a range of different ways depending on individual preference. In current gesture detection software, rotating an object is compared to a gesture of two thumb points being twisted 90 degrees. Another example is using a swipe gesture, detected as forming a predetermined angle of being perfectly horizontal with respect to the touch screen display. To recognize these gestures, the user's movement is compared precisely with their associated motions. Often, a user is required to repeat the gesture several times to have the movement recognized appropriately and performed accordingly, causing frustration and reducing user satisfaction. In addition, current methods of approximating zooming or pinching are not also able to detect translation or rotation at the same time. Thus, the user is unable to perform a complex movement such as rotating an image as well as translating and zooming on it, limiting the user from engaging in more complex activities on a computing device with a touch-screen.

Therefore, there is a need in the art for a method and apparatus for interpreting multi-touch events on a computing device in a simpler and more general manner.

SUMMARY

Embodiments of the present invention relate to a computer implemented method for interpreting multi-touch events on a computing device comprising creating a reference coordinate system using first two touch points A and B on the device, creating a modified coordinate system using second two touch points C and D on the device, determining a reference origin point (O) for the reference coordinate system where a first angle is formed by the points AOB as a right angle and determining a modified origin point (O') for the modified coordinate system where a second angle is formed by points CO'D as a right angle, and calculating a transformation matrix T between the reference coordinate system and the modified coordinate system.

Embodiments of the present invention also relate to an apparatus for interpreting multi-touch events comprising a touch detector for detecting a reference set of touch points and a modified set of touch points, a coordinate processing module, coupled to the touch detector, for determining a reference origin point (O) for a reference coordinate system from the reference set of touch points and for determining a modified origin point (O') for a modified coordinate system from the modified set of touch points, and a transformation module, coupled to the coordinate processing module, for calculating a transformation matrix representing a matrix transformation from the reference coordinate system to the modified coordinate system.

BRIEF DESCRIPTION OF THE DRAWINGS

So that the manner in which the above recited features of embodiments of the present invention can be understood in detail, a more particular description of the invention, briefly summarized above, may be had by reference to typical embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a computer implemented method and apparatus for interpreting multi-touch events on a computing device. In an exemplary embodiment, the present invention creates a reference coordinate system and a modified coordinate system from an initial position of two touch points and a modified coordinate system from a final position of two touch points. The origin points in the reference system and the modified system are computed using simple math, such that three points are able to represent a two-dimensional coordinate space. Both the reference coordinate system and the modified coordinate system are represented as matrices with basis vectors as the axes of the coordinate system. The transformation matrix between the reference coordinate system and the modified coordinate system is composed of a rotation/scaling matrix coupled with a translation matrix. The transformation matrix may be applied to any desirable object or application executing on the computing device.

Figure 1:
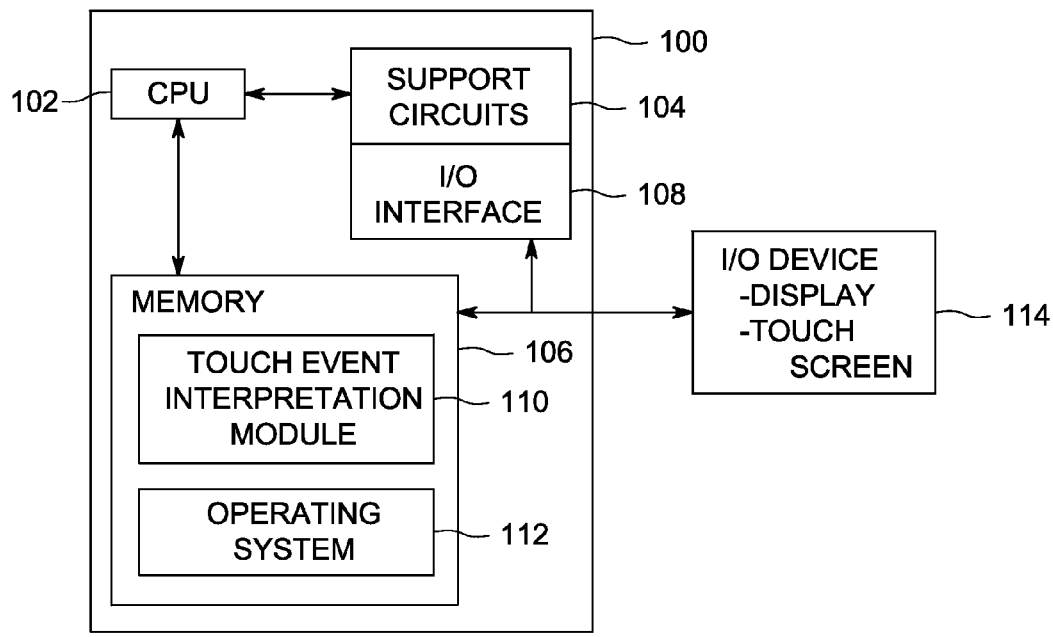
FIG. 1 depicts a block diagram of a computer in which an embodiment of the present invention is used.

FIG. 1 is a block diagram depicting an embodiment of a computer 100 providing a program interface in accordance with embodiments of the present invention. The computer system 100 comprises a processor 102, various support circuits 104, a memory 106, an I/O Interface 108 and connected I/O devices 114. The processor 102 may include one or more microprocessors known in the art. The support circuits 104 for the processor 102 include conventional cache, power supplies, clock circuits, data registers, I/O interfaces 108, and the like. The I/O interface 108 may be directly coupled to the memory 106 or coupled through the supporting circuits 104. The I/O interface 108 may also be configured for communication with input devices and/or output devices 114, such as, network devices, various storage devices, mouse, keyboard, display, touch sensitive screen and the like.

The memory 106, or computer readable medium, stores non-transient processor-executable instructions and/or data that may be executed by and/or used by the processor 102. These processor-executable instructions may comprise firmware, software, and the like, or some combination thereof. Modules having processor-executable instructions that are stored in the memory 106 comprise at least a touch event interpretation module 110. The computer system 100 may be programmed with one or more operating systems (generally referred to as operating system (OS) 220), which may include OS/2, Java Virtual Machine, Linux, Solaris, Unix, HPUX, AIX, Windows, Windows95, Windows98, Windows NT, and Windows2000, Windows ME, Windows XP, Windows Server, among other known platforms. At least a portion of the operating system 112 may be disposed in the memory 106. The memory 106 may include one or more of the following random access memory, read only memory, magneto-resistive read/write memory, optical read/write memory, cache memory, magnetic read/write memory, and the like, as well as signal-bearing media as described below.

Figure 2:
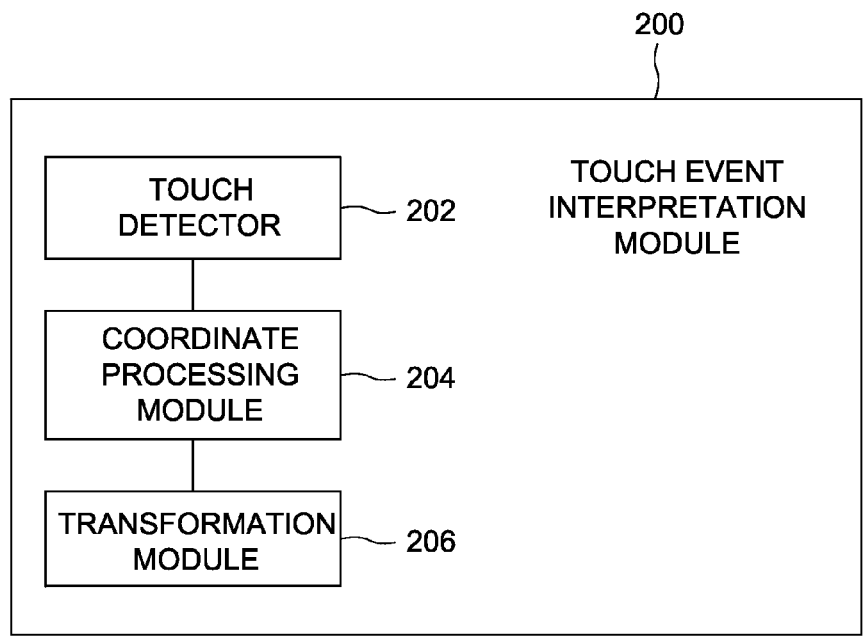
FIG. 2 depicts a block diagram of an implementation of a touch event interpretation module according to an exemplary embodiment of the present invention.

FIG. 2 is a block diagram of an exemplary embodiment of an implementation of the touch event interpretation module 110. The module 200 comprises a touch detector 202, a coordinate processing module 204 and a transformation module 206. The touch detector 202 detects reference touch points and modified touch points on a computing device according to the internal coordinate system of the device. The coordinate processing module 204 determines a reference origin point and a modified origin point for the reference coordinate system and the modified coordinate system. The transformation module 206 calculates the matrix transform T required to move from the reference coordinate system to the modified coordinate system, such that this transform T can be applied to any points on the display of the computing device while the reference and modified touch points are detected.

Figure 3:
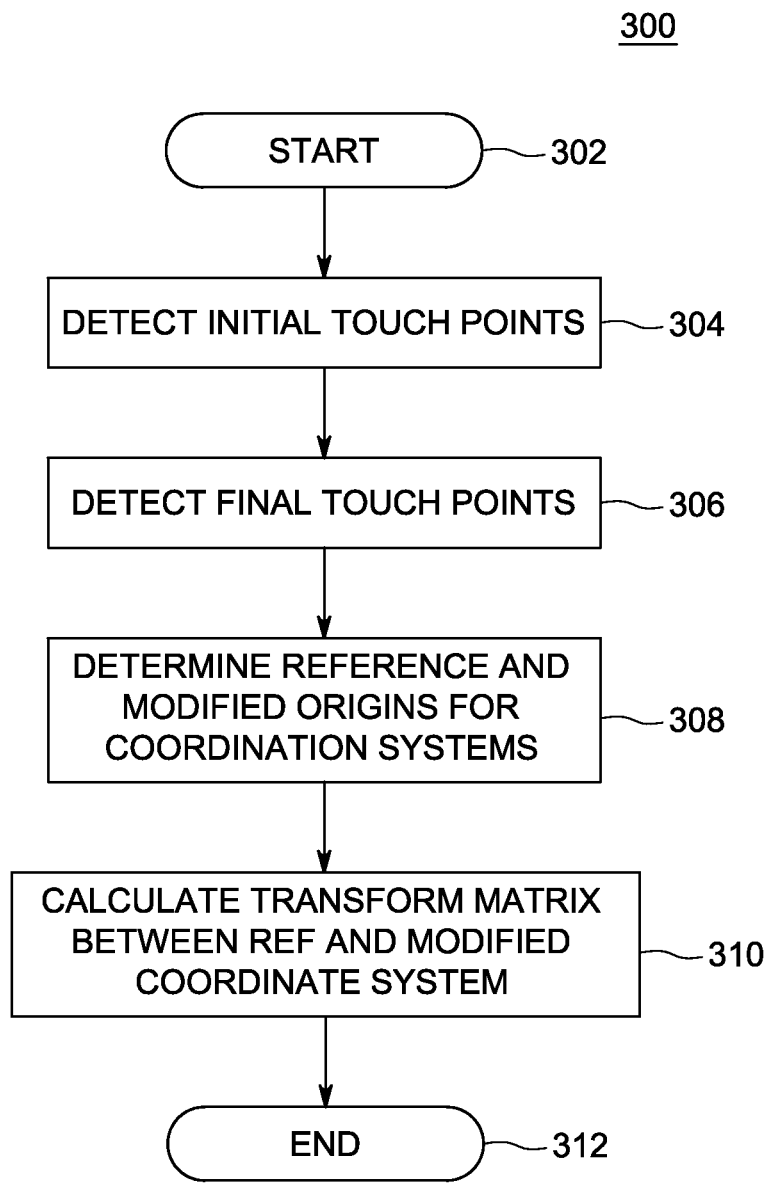
FIG. 3 depicts a flow diagram of a method for interpreting multi-touch events in a computing device according to an exemplary embodiment of the present invention.

FIG. 3 is a flow diagram of a method 300 for operation of the apparatus 200 in accordance with embodiments of the present invention. FIG. 3 represents implementation of the method for interpreting multi-touch events, where the touch event interpretation module 110 of FIG. 1 is stored in memory 106 and executed by the processor 102. According to FIG. 3 the method 300 starts at step 302 and proceeds to step 304. At step 304, an initial two reference touch points are detected from a touch-screen. A user of the computing device then moves his or her fingers to a different portion of the touch-screen. At step 306, the final modified touch points are detected from the touch-screen. At step 308, the method 300 determines the reference origin point O and the modified origin point O' for the reference coordinate system and the modified coordinate system. The method 300 then proceeds to step 310, where the transformation matrix between the reference coordinate system and the modified coordinate system is calculated. The method ends at step 312.

Figure 4:
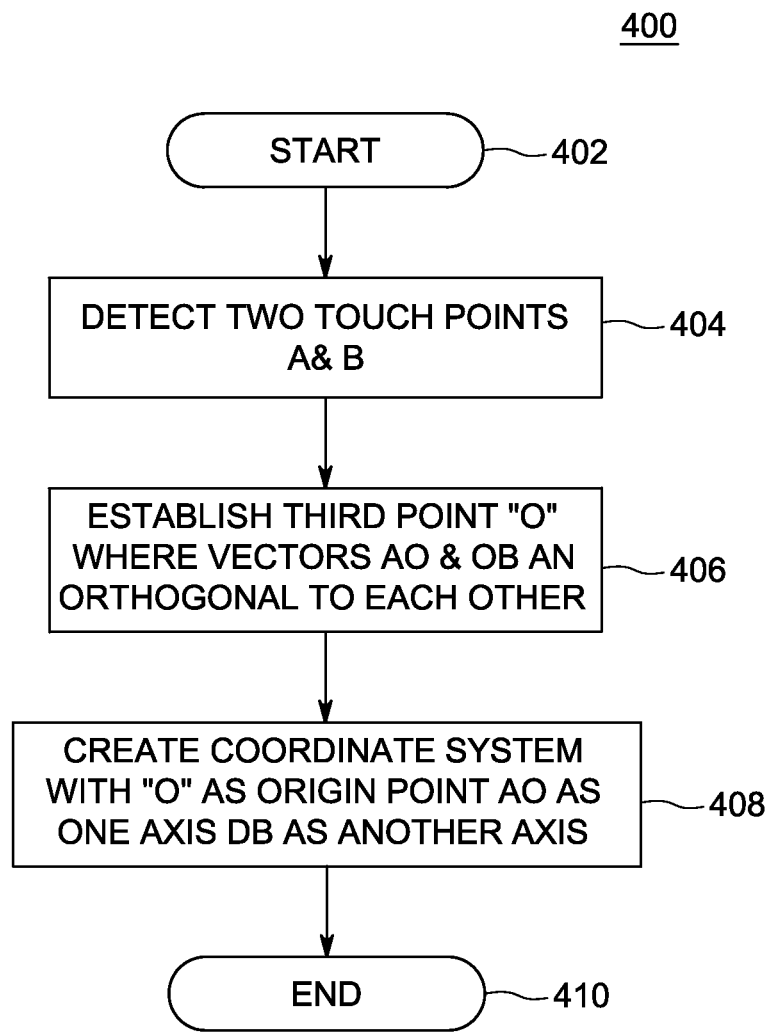
FIG. 4 depicts a flow diagram of a method for creating a coordinate system from two touch points on a computing device according to an exemplary embodiment of the present invention.

FIG. 4 is a flow diagram of a method 400 representing implementation of the coordinate processing module 204 in the apparatus 200 for creating a coordinate system from two touch points on a computing device, in accordance with embodiments of the present invention. The coordinate processing module 204 is stored in memory 106 and executed by the processor 102. The method 400 starts at step 402 and moves to step 404. At step 404, two touch points A and B are detected through a touch screen on the device. In order to create a coordinate system from two arbitrary touch points, a third point, an origin O of the coordinate system is determined at step 406. At step 406, the origin point O is chosen such that a vector connecting points A and O (AO) and a vector connecting points O and B (OB) are orthogonal to each other. In other words, the angle AOB is a ninety degree angle, or a right triangle. At step 408, the method 400 has already established three points, A, O and B, such that O is the origin point, AO is one axis and OB is the other axis in two dimensional space. The method 400 ends at step 410 once a coordinate system has been constructed by two touch points A and B and calculated third origin point O.

Figure 5:
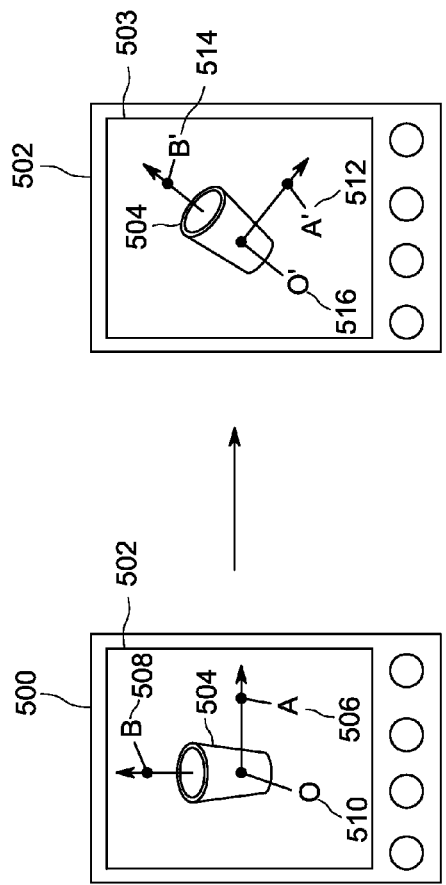
FIG. 5 depicts an illustration of a computing device using the method for interpreting multi-touch events according to an exemplary embodiment of the present invention.

FIG. 5 is an illustration of an example of a computing device 500 with a touch screen 502 and an image 504 being displayed on the screen 502. The screen 502 also shows two touch points A 506 and B 508. These are points at which the user touches the screen 502. These points are not displayed on the screen to the user, but are shown in FIG. 5 as representative of where a user has placed his or her fingers. In addition, an origin point O 510 as calculated in method 400 is depicted in the illustration in FIG. 5 but is not shown on the actual screen 502 to the user. O, A and B represent a local coordinate system for the object 504. The object 504 can be rotated, scaled and translated accurately using two reference touch points and two modified touch points. The modified touch points are represented by points A' 512 and B' 514 in computing device 501 on the screen 503. Object 504 is rotated from its original orientation to a new orientation. A' 512 and B' 514 represent the modified touch points and O' 516 represents the newly calculated modified origin point. The transformation matrix T which represents the transformation from screen 502 to screen 503 for the object 504 is calculated as described above in method 300. The transformation matrix T is applied to object 504 in the depiction in the screen 502 and the result is the rotation of object 504 as in screen 503. A similar transformation can be applied to scale object 504 to a greater or smaller size.

Figure 6:
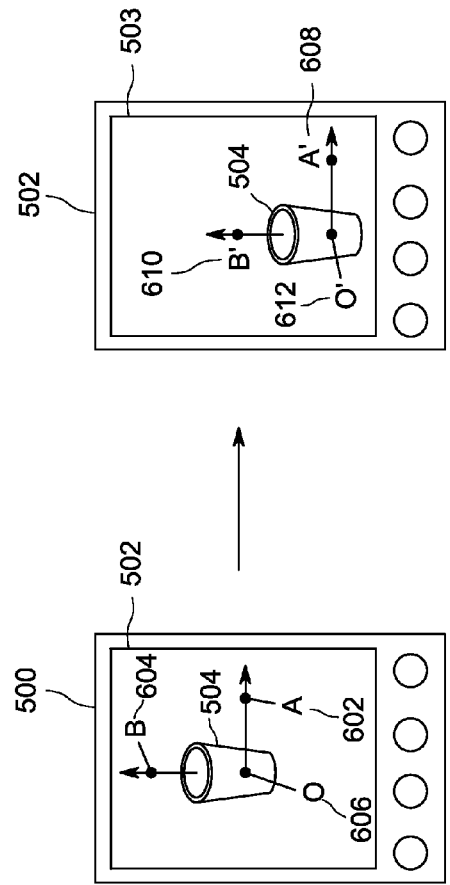
FIG. 6 depicts an illustration of a computing device using the method for interpreting multi-touch events according to an exemplary embodiment of the present invention.

FIG. 6 is an illustration of an example of the computing device 500 with a touch screen 502 and an image 504 being displayed on the screen 502. The screen 502 also shows two touch points A 602 and B 604. These are points at which the user has touched the screen 502. These points are not displayed on the screen to the user, but are shown in FIG. 6 as representative of where a user has placed his or her fingers. In addition, an origin point O 606 as calculated in method 400 is depicted in the illustration in FIG. 6 but is not shown on the actual screen 502 to the user. O, A and B represent a local coordinate system for the object 504. The object 504 can be rotated, scaled and translated using two reference touch points and two modified touch points. The modified touch points are represented by points A' 608 and B' 610 in computing device 501 on the screen 503. Object 504 is translated from its original position to a new position. A' 608 and B' 610 represent the modified touch points and O' 612 represents the newly calculated modified origin point. The transformation between the coordinate system represented by points A 602, B 604 and O 606 to the points A' 608, B' 610 and O' 612 is represented by a simple vector, O.

Figure 7:
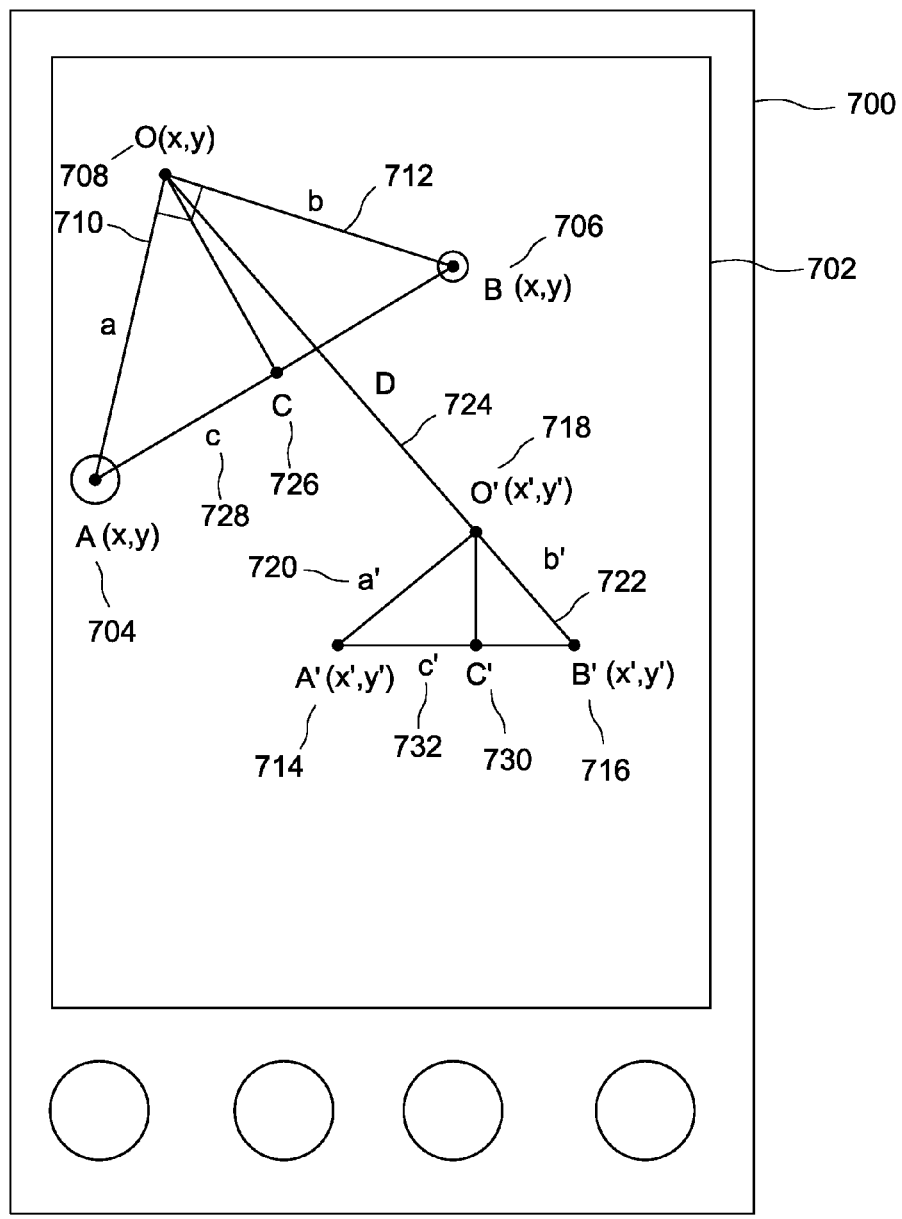
FIG. 7 depicts an illustration of a computing device using the method for interpreting multi-touch events according to an exemplary embodiment of the present invention.

FIG. 7 is an illustration of the computation of the origin point O and O' in addition to the rotation, translation and scaling from the reference coordinate system represented by O, A and B to the modified coordinate system represented by O', A', and B'. In an exemplary embodiment, rotating, scaling and transforming object 504 in FIG. 5 and FIG. 6 are combined and represented by a single transformation matrix as shown in FIG. 7. According to FIG. 7 there are two reference touch points A 704 and B 706. Point O 708 is calculated according to method 400 and represents the origin point of a reference coordinate system. A vector a 710 joins points A and O and a vector b 712 joins points B and O. The location of O 708 is calculated according to the following formula:

$$O = A + 0.5 \begin{pmatrix} B1 - A1 - B2 + A2 \\ B2 - A2 + B1 - A1 \end{pmatrix}.$$

Here, A1 represents the x coordinate of point A 704, A2 represents the y coordinate of point A 704, B1 represents the x coordinate of point B 706, and B2 represents the y coordinate of point B 706. The origin point O 708 is calculated by calculating the half way point C 726 between point A 704 and B 706. The vector c 728 represents the vector formed by joining points A and C. The vector c 728 is then rotated ninety degrees clockwise and the end point of vector c 728 represents the location of origin point O 708. A similar calculation is done using points A' 714, B' 716 and C' 730 to compute the modified origin point O' 718. Point C' is computed as the half-way point between A' and B'. The vector c' 732 represents the vector formed by joining points A' and C'. The vector c' 732 is then rotated ninety degrees clockwise and the end point of vector c' 732 represents the location of origin point O' 718. Finally, the vector D 724 represents the translation between the two coordinate systems and is computed as D=O'-O.

In computing a transformation between the reference coordinate system represented by points A, O and B in FIG. 7 and the modified coordinate system represented by points A', O' and B' in FIG. 7, in an exemplary embodiment, a reference matrix R and a modified matrix M are composed. R and M are matrix representations of their respective coordinate systems. Reference matrix R is a 2×2 matrix whose columns are composed of the basis vectors a 710 and b 712. In mathematical terms, the matrix R can be represented as $$R = \begin{pmatrix} a1 & b1 \\ a2 & b2 \end{pmatrix}.$$

Modified matrix M is a 2×2 matrix whose columns are composed of the basis vectors a' 714 and b' 716. In mathematical terms, the matrix M can be represented as $$M = \begin{pmatrix} a'1 & b'1 \\ a'2 & b'2 \end{pmatrix}.$$

A matrix X represents the scaling and rotation conversion from the matrix R to the matrix M. The matrix T is represented mathematically as $X=M^{-1}R$, or alternatively, T is the resulting matrix from the operation of inverting matrix M and multiplying it with matrix R. As discussed above, the vector D 724 represents the positional translation between the reference and modified coordinate system. Finally, the vector D 724 for translation and the matrix X for scaling and rotation can be combined into a single transformation matrix T which encodes the full interpretation of the touch point movements:

$$T = \begin{pmatrix} -O1 \\ -O2 \\ 1 \end{pmatrix} \begin{pmatrix} X11 & X12 & 0 \\ X21 & X22 & 0 \\ 0 & 0 & 1 \end{pmatrix} \begin{pmatrix} O'1 \\ O'2 \\ 1 \end{pmatrix}$$

where Xii refers to the matrix element i, i. For example, X11, refers to the value in the first column, first row of matrix X and X21 refers to the second column, first row of Matrix X.

The matrix T represents the full movement including scaling, rotation and translation as depicted in FIG. 7, from the reference coordinate system of points A, O and B to the modified coordinate system represented by points A', O' and B'. In an exemplary embodiment, transformation T can now be used in any application or applied to any image or object on the computing device, causing accurate manipulation according to a user's touch-events on the touch screen capable device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method for interpreting multi-touch events on a computing device comprising:
creating a reference coordinate system using first two touch points A and B on the device;
creating a modified coordinate system using second two touch points C and D on the device;
determining a reference origin point (O) for the reference coordinate system where a first angle is formed by the points AOB as a right angle and determining a modified origin point (O') for the modified coordinate system where a second angle is formed by points CO'D as a right angle;
calculating a transformation matrix T between the reference coordinate system and the modified coordinate system, wherein the transformation matrix T comprises the matrix product of an inverted rotation/scaling matrix R and a translation matrix D relating to the rotation/scaling and the translation from the reference coordinate system to the modified coordinate system, the columns of R being a first reference basis vector and a second reference basis vector forming the reference coordinate system and a first and second modified basis vector forming the modified coordinate system; and applying the transformation matrix T to one or more objects displayed on the computing device while the first two touch points and the second two touch points are detected in sequence, wherein the first reference basis vector is a vector from O to A and the second reference basis vector is a vector from O to B, and the first modified basis vector is a vector from the O' to C and the second modified basis vector is a vector from O' to D.

2. The method of claim 1 wherein the first and second reference basis vectors are orthogonal to each other and the first and second modified basis vectors are orthogonal to each other.

3. The method of claim 1 wherein the first and second reference basis vector form a first and second reference axis of the reference coordinate system and the first and second modified basis vector form a first and second modified axis of the modified coordinate system.

4. The method of claim 1 wherein O and O' are determined by the following formula $$O = A + 0.5\left(\begin{array}{c} B1 - A1 - B2 + A2 \\ B2 - A2 + B1 - A1 \end{array}\right) \text{ and } O' = C + 0.5\left(\begin{array}{c} D1 - C1 - D2 + C2 \\ D2 - C2 + D1 - A1 \end{array}\right),$$

where B1 and B2 respectively represent an x and y coordinate of B and A1 and A2 respectively represent an x and y coordinate of A; C1 and C2 respectively represent an x and y coordinate of C and D1 and D2 respectively represent an x and y coordinate of D.

5. An apparatus for interpreting multi-touch events on a computing device comprising:

a touch detector for detecting a reference set of touch points as a first two touch points and a modified set of touch points as a second two touch points;

a coordinate processing module, coupled to the touch detector, for determining a reference origin point (O) for a reference coordinate system from the reference set of touch points and for determining a modified origin point (O') for a modified coordinate system from the modified set of touch points;

a transformation module, coupled to the coordinate processing module, for calculating a transformation matrix T representing a matrix transformation from the reference coordinate system to the modified coordinate system, wherein the transformation matrix T comprises the matrix product of an inverted rotation/scaling matrix R and a translation matrix D relating to the rotation/scaling and the translation from the reference coordinate system to the modified coordinate system, the columns of R being a first reference basis vector and a second reference basis vector forming the reference coordinate system and a first and second modified basis vector forming the modified coordinate system; and applying the transformation matrix T to one or more objects displayed on the computing device while the first two touch points and the second two touch points are detected in sequence, wherein the first reference basis vector is a vector from O to A and the second reference basis vector is a vector from O to B, and the first modified basis vector is a vector from the O' to C and the second modified basis vector is a vector from O' to D.

6. The apparatus of claim 5 wherein the reference set of touch points comprise two touch points A and B and the modified set of touch points comprise two touch points C and D.

7. The apparatus of claim 6 wherein the coordinate processing module determines the location of O where an angle AOB forms a right angle and the coordinate processing module determines the location of O' where an angle CO'D forms a right angle.

8. A non-transitory computer readable medium for storing software that, when executed by a processor, causes a computing device to:

create a reference coordinate system using first two touch points A and B on the device;

create a modified coordinate system using second two touch points C and D on the device;

determine a reference origin point (O) for the reference coordinate system where a first angle is formed by the points AOB as a right angle and determine a modified origin point (O') for the modified coordinate system where a second angle is formed by points CO'D as a right angle; and calculate a transformation matrix T between the reference coordinate system and the modified coordinate system, wherein the transformation matrix T comprises the matrix product of an inverted rotation/scaling matrix R and a translation matrix D relating to the rotation/scaling and the translation from the reference coordinate system to the modified coordinate system, the columns of R being a first reference basis vector and a second reference basis vector forming the reference coordinate system and a first and second modified basis vector forming the modified coordinate system; and applying the transformation matrix T to one or more objects displayed on the computing device while the first two touch points and the second two touch points are detected in sequence, wherein the first reference basis vector is a vector from O to A and the second reference basis vector is a vector from O to B, and the first modified basis vector is a vector from the O' to C and the second modified basis vector is a vector from O' to D.

9. The computer readable medium of claim 8 wherein the first and second reference basis vectors are orthogonal to each other and the first and second modified basis vectors are orthogonal to each other.

10. The computer readable medium of claim 8 wherein the first and second reference basis vector form a first and second reference axis of the reference coordinate system and the first and second modified basis vectors form a first and second modified axis of the modified coordinate system.

11. The computer readable medium of claim 8 wherein O and O' are determined by the following formula $$O = A + 0.5\left(\begin{array}{c} B1 - A1 - B2 + A2 \\ B2 - A2 + B1 - A1 \end{array}\right) \text{ and } O' = C + 0.5\left(\begin{array}{c} D1 - C1 - D2 + C2 \\ D2 - C2 + D1 - A1 \end{array}\right),$$

where B1 and B2 respectively represent an x and y coordinate of B and A1 and A2 respectively represent an x and y coordinate of A; C1 and C2 respectively represent an x and y coordinate of C and D1 and D2 respectively represent an x and y coordinate of D.

12. A computer implemented method for interpreting multi-touch events on a computing device comprising:
creating a reference coordinate system using first two touch points A and B on the device;
creating a modified coordinate system using second two touch points C and D on the device;
determining a reference origin point (O) for the reference coordinate system where a first angle is formed by the points AOB as a right angle and determining a modified origin point (O') for the modified coordinate system where a second angle is formed by points CO'D as a right angle; and
calculating a transformation matrix T between the reference coordinate system and the modified coordinate system,
wherein O and O' are determined by the following formula $$O = A + 0.5\left(\frac{B1 - A1 - B2 + A2}{B2 - A2 + B1 - A1}\right) \text{ and } O' = C + 0.5\left(\frac{D1 - C1 - D2 + C2}{D2 - C2 + D1 - A1}\right),$$

where B1 and B2 respectively represent an x and y coordinate of B and A1 and A2 respectively represent an x and y coordinate of A; C1 and C2 respectively represent an x and y coordinate of C and D1 and D2 respectively represent an x and y coordinate of D.

* * * * *